(12) United States Patent
Amick et al.

(10) Patent No.: US 7,078,457 B2
(45) Date of Patent: Jul. 18, 2006

(54) POLYMER COMPOSITION AND PROCESS FOR THE PREPARATION THEREOF

(75) Inventors: David Richard Amick, Doylestown, PA (US); Ralph Craig Even, Blue Bell, PA (US); Ann Robertson Hermes, Ambler, PA (US); Rosemarie Palmer Lauer, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 133 days.

(21) Appl. No.: 10/617,330

(22) Filed: Jul. 10, 2003

(65) Prior Publication Data

US 2004/0167274 A1   Aug. 26, 2004

Related U.S. Application Data

(60) Provisional application No. 60/399,614, filed on Jul. 30, 2002.

(51) Int. Cl.
*C08L 33/02* (2006.01)

(52) U.S. Cl. .............. 524/556; 524/560; 524/832; 526/227; 526/230

(58) Field of Classification Search .............. 526/227, 526/317.1, 320, 230; 524/556, 560, 832
See application file for complete search history.

(56) References Cited

U.S. PATENT DOCUMENTS

| | | | | |
|---|---|---|---|---|
| 4,063,013 A | | 12/1977 | Friedman et al. | 526/227 |
| 4,384,096 A | * | 5/1983 | Sonnabend | 526/313 |
| 4,514,552 A | | 4/1985 | Shay et al. | 526/301 |
| 4,600,761 A | * | 7/1986 | Ruffner et al. | 526/270 |
| 4,672,005 A | * | 6/1987 | Dyer | 428/474.4 |
| 5,268,437 A | * | 12/1993 | Holy et al. | 526/229 |
| 5,326,843 A | | 7/1994 | Lorah et al. | 526/318 |
| 5,401,802 A | * | 3/1995 | Jenkins et al. | 524/845 |
| 5,476,900 A | | 12/1995 | Jenkins et al. | 524/823 |
| 5,597,509 A | * | 1/1997 | Kirk et al. | 510/223 |
| 5,703,155 A | * | 12/1997 | Swarup et al. | 524/558 |
| 6,403,703 B1 | * | 6/2002 | Slone | 524/832 |
| 6,524,656 B1 | * | 2/2003 | Even et al. | 427/393.5 |
| 6,545,084 B1 | * | 4/2003 | Brown et al. | 524/556 |
| 6,552,142 B1 | * | 4/2003 | Meffert et al. | 526/264 |
| 6,696,519 B1 | * | 2/2004 | Brown et al. | 524/804 |

FOREIGN PATENT DOCUMENTS

| | | | |
|---|---|---|---|
| EP | 1078938 | | 2/2001 |
| GB | 2089353 | | 6/1982 |
| GB | 2334719 | | 9/1999 |
| JP | 09143444 A | * | 6/1997 |
| WO | WO 9103496 | | 3/1991 |

OTHER PUBLICATIONS

U.S. Appl. No. 09/887,929, filed Jun. 22, 2001, Lorah et al.
U.S. Appl. No. 09/981,350, filed Oct. 17, 2001, Lorah et al.
U.S. Appl. No. 09/882,024, filed Jun. 18, 2001, Even.

* cited by examiner

*Primary Examiner*—David W. Wu
*Assistant Examiner*—Satya B. Sastri
(74) *Attorney, Agent, or Firm*—Kim R. Jessum; Gary Breenblatt

(57) ABSTRACT

An aqueous composition including a polymer having polymerized ethylenically unsaturated acid monomer is disclosed. The aqueous composition is prepared in the presence of select organic compounds. As provided is a process to prepare the aqueous composition. The aqueous composition is useful as a dispersant for inorganic particles, a thickener or rheology modifiers for various aqueous formulations, and as a dispersing resin.

15 Claims, No Drawings

POLYMER COMPOSITION AND PROCESS FOR THE PREPARATION THEREOF

CROSS REFERENCE TO RELATED PATENT APPLICATION

This is a non-provisional application of prior pending U.S. provisional application Ser. No. 60/399,614 filed Jul. 30, 2002.

This invention generally relates to an aqueous composition suitable for use as a thickener or rheology modifier in various compositions including paints, paper coating formulations, adhesives, and textile formulations. More specifically, the invention relates to an aqueous composition including a polymer containing pendant ionic groups. The polymer is prepared by a polymerization process in the presence of select organic compounds.

Aqueous formulations, such as paints, adhesives, textile formulations, and paper coating compositions, typically use thickeners to obtain the desired rheology needed for the preparation and the proper application of the aqueous formulation. For example, an aqueous paper coating composition requires thickeners, also referred to as rheology modifiers, to allow sufficient low shear viscosity to allow pickup and application of the coating composition onto a paper substrate as well as the appropriate high shear viscosity to allow metering of the excess applied coating composition to obtained a desired coating weight. One class of thickeners suitable for thickening aqueous formulations are alkali-soluble thickeners. These thickeners, also referred to as alkali-swellable thickeners, are copolymers formed by the polymerization of ethylenically unsaturated monomers and contain acid groups pendant to backbone of the copolymer. Alkali-soluble thickeners are commonly provided in an inactive form as low viscosity, high solids, aqueous dispersions of copolymer particles at a pH below the $pK_a$ of the acid groups. After addition into an aqueous formulation, the copolymer particles of the alkali-soluble thickener are activated by the addition of base, which leads to swelling or solubilization of the copolymer with the concomitant thickening of the aqueous formulation. Alkali-soluble thickeners have also been prepared containing pendant nonionic surfactant groups or hydrophobes. These thickeners, known in the art as hydrophobically-modified alkali-soluble (swellable) thickeners, are characterized by increased thickening efficiency compared to alkali-soluble thickeners of similar composition and molecular weight.

The thickening efficiency of alkali-soluble thickeners is dependent on various factors, including the molecular weight and the composition of the copolymer, especially the level of pendant acid groups and the optional pendant hydrophobes. Further, the thickening efficiency is affected by the polymerization process used to prepare alkali-soluble thickeners. Batch-to-batch variations in the thickening efficiency of alkali-soluble thickeners are believed to be attributed to minor variations in the polymerization process. A polymerization process is desired for preparing alkali-soluble thickeners having reduced batch-to-batch variation in thickening efficiency.

U.S. Pat. No. 4,514,552 discloses alkali soluble thickeners that are prepared as aqueous emulsion copolymers. The disclosed copolymers contain 20 to 70 weight % ethylenically unsaturated carboxylic acid, 20 to 80 weight % ethylenically unsaturated monomer lacking surfactant capacity, 0.5 to 60 weight % of a nonionic urethane monomer containing a nonionic surfactant, and 0 to 2 weight % of a polyethylenically unsaturated monomer. The disclosed process to prepare the copolymers is aqueous emulsion copolymerization. Examples 2 and 3 exemplify aqueous emulsion copolymerization using a thermal process in the presence of sodium persulfate to initiate the reaction.

The problem faced by the inventors is the provision of an aqueous polymerization process for preparing alkali-soluble thickeners that have reduced batch-to-batch variability in thickening efficiency. Unexpectedly, the inventors have found an aqueous process involving free radical polymerization in the presence of select organic compounds that provides alkali-soluble thickeners having improved batch-to-batch reproducibility of the thickening efficiency.

According to the first aspect of the present invention, an aqueous composition is provided including a polymer containing as polymerized units, based on the total weight of the polymer: from greater than 7.5 to 100 weight % of at least one ionic monomer, and from 0 to less than 92.5 weight % of at least one second monomer; wherein the polymer is formed by an aqueous free radical polymerization process in the presence of 0.01 to 1 weight %, based on the total weight of the polymer, of an organic compound selected t-alkyl hydroperoxides, t-alkyl peroxides, t-alkyl peresters, and mixtures thereof, wherein the t-alkyl group has at least 5 carbon atoms.

A second aspect of the present invention provides a process for preparing an aqueous composition including a polymer, the polymer containing as polymerized units, from greater than 7.5 to 100 weight % of at least one ionic monomer; and from 0 to less than 92.5 weight % of at least one second monomer, based on the total weight of the polymer; including the step of: polymerizing the monomers in an aqueous reaction medium by free radical polymerization in the presence of 0.01 to 1 weight %, based on the total weight of the polymer, of an organic compound selected from t-alkyl hydroperoxides, t-alkyl peroxides, t-alkyl peresters, and mixtures thereof, wherein the t-alkyl group has at least 5 carbon atoms.

The use of the term "(meth)" followed by another term such as acrylate refers to both acrylates and methacrylates. For example, as used herein, the term "(meth)acrylate" refers to either acrylate or methacrylate, the term "(meth)acrylic" refers to either acrylic or methacrylic, and the term "(meth)acrylamide" refers to either acrylamide or methacrylamide.

The present invention relates to an aqueous composition containing a polymer. The polymer is characterized as containing as polymerized units, at least one ethylenically unsaturated ionic monomer and optionally, a second ethylenically unsaturated monomer, based on the total weight of the polymer.

The ethylenically unsaturated ionic monomer, referred to herein as "ionic monomer" is characterized as containing an ionic group, such as an acid group or an amine, and an ethylenically unsaturated moiety such as an acrylate, a methacrylate, or vinyl group. Examples of acid monomers include carboxylic acid monomers, such as, for example, acrylic acid, methacrylic acid, crotonic acid, itaconic acid, fumaric acid, maleic acid, monomethyl itaconate, monomethyl fumarate, monobutyl fumarate, and maleic anhydride; sulfur-containing acid monomers such as 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, and sulfoethyl (meth)acrylate; and phosphorus-containing acid monomers including phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth) acrylates, phosphodialkyl crotonates, and allyl phosphate. Examples of amine monomers include oxazolidinylethyl (meth)acrylate, vinyl amine, ethyleneimine, 3-(γ-methacryl-oxypropyl)-tetrahydro-1,3-oxazine, 3-(β-methacryloxy-ethyl)-2,2-penta-methylene-oxazolidine, 3-(β-methacryloxyethyl)-2-methyl-2-propyloxazoline, N-2-(2-acryloxyethoxy)ethyl oxazolidine, N-2-(2-methacryloxyethozy)ethyl oxazolidine, dimethylaminoethyl (meth)acrylate, β-aminoethyl (meth)acrylate, N-(monom-ethylaminoethyl) (meth)acrylamide, N-(mono-n-butyl)-4-aminobutyl (meth)acrylate, methacryloxyethoxy ethylamine, ethylene amine, propylene amine, dimethyl aminopropyl (meth)acrylamide and acryloxypropoxy propylamine. The polymer is characterized as containing, as polymerized units, greater than 7.5 weight %, preferably at least 15 weight %, and more preferably at least 25 weight %, of at least one ionic monomer, based on the total weight of the polymer. A suitable upper limit to the level of the ionic monomer contained as polymerized units in the polymer is 100 weight %. For polymers prepared by emulsion polymerization, a suitable upper limit for the level of the ionic monomer is preferably 70 weight % and more preferably 65 weight %, based on the total weight of the polymer. In one embodiment, the polymer is a copolymer formed from two or more different ionic monomers. This embodiment includes amphoteric copolymers that contain as polymerized units at least one acid monomer and at least one amine monomer. Examples are a copolymer containing as polymerized units, 6 weight % methacrylic acid and 3 weight % acrylic acid; a copolymer containing as polymerized units, 5 weight % methacrylic acid and 5 weight % vinyl sulfonic acid; a copolymer containing as polymerized units, 55 weight % vinyl amine and 45 weight % ethyleneimine; based on the weight of the copolymer; and a copolymer containing 5 weight % of at least one acid monomer and 4 weight % of at least one amine monomer, based on the weight of the copolymer. Preferred acid monomers include acrylic acid and methacrylic acid. Methacrylic acid is a more preferred acid monomer. Preferred amine monomers include oxazolidinylethyl (meth)acrylate, vinyl amine, dimethyl aminopropyl (meth)acrylamide, and ethyleneimine.

The second ethylenically unsaturated monomer, referred to herein as "second monomer" is characterized as containing an ethylenically unsaturated moiety and not containing an ionic group. Second monomers are monomers that are not ionic monomers. Suitable second monomers include, for example, (meth)acrylic ester monomers including methyl (meth)acrylate, ethyl (meth)acrylate, butyl (meth)acrylate, 2-ethylhexyl (meth)acrylate, decyl (meth)acrylate, lauryl (meth)acrylate, stearyl (meth)acrylate, hydroxyethyl (meth)acrylate, and hydroxypropyl (meth)acrylate; styrene and substituted styrenes; butadiene; vinyl acetate, vinyl butyrate and other vinyl esters; vinyl monomers such as vinyl chloride, vinyl toluene, and vinyl benzophenone; vinylidene chloride; and multiethylenically unsaturated monomers include allyl (meth)acrylate, 1,2-ethylene glycol di(meth)acrylate, 1,4-butylene glycol di(meth)acrylate, 1,6-hexanediol (meth)acrylate, divinyl benzene, and diallyl phthalate. The polymer contains as polymerized units, 0 weight %, preferably at least 30 weight %, and more preferably at least 35 weight % of at least one second monomer, based on the total weight of the polymer. The upper limit to the level of the at least one second monomer contained as polymerized units in the polymer is less than 92.5 weight %, preferably less than or equal to 85 weight %, and more preferably less than or equal to 75 weight %, based on the total weight of the polymer. Further, a suitable range for the multiethylenically unsaturated monomer as a polymerized units in the polymer, is from 0 to 5 weight %, based on the total weight of the polymer.

The glass transition temperature of the polymer is determined by the types of monomers and their levels contained as residues in the polymer. Suitable ranges for the glass transition temperature of the polymer include values in the range of from −30° C. to 120° C., preferably in the range of from −20° C. to 100° C., and more preferably in the range of from −10° C. to 80° C. The glass transition temperature is determined by differential scanning calorimetry.

Typically, the weight average molecular weight of the polymer is chosen for an intended application. For example, in the application of the polymer as a dispersant, a typical weight average molecular weight is in the range of from 1,000 to 100,000; preferably in the range of from 1,000 to 50,000; and more preferably in the range of from 1,000 to 20,000. In the application of the polymer as a thickener or rheology modifier, a typical weight average molecular weight is in the range of from 25,000 to greater than 1,000,000. A weight average molecular weight for the polymer employed as a dispersing resin is generally in the range of from 8,000 to 60,000. The weight average molecular weight ($M_w$) and the number average molecular weight ($M_n$) are measure using differential scanning calorimetry.

In one embodiment, the polymer is an predominately acrylic polymer. As used herein, the term "predominately acrylic" means that the polymer contains greater than 50 weight %, preferably greater than 60 weight %, and more preferably, greater than 70 weight %, based on the total weight of the polymer, copolymerized units derived from (meth)acrylic monomers such as alkyl esters of (meth)acrylic acid, (meth)acrylamides, (meth)acrylonitrile, and (meth)acrylic acid.

In one embodiment, the polymer is provided as an aqueous composition containing the polymer as discrete particles dispersed in an aqueous medium. In this aqueous dispersion, the average particle diameter of the polymer particles is typically in the range of from 20 to 1,000 nanometers (nm), preferably in the range of from 50 to 500 nm, and more preferably, in the range of from 75 to 350 nm. Particle sizes herein are those determined using a Brookhaven Model BI-90 particle sizer manufactured by Brookhaven Instruments Corporation, Holtsville, N.Y., reported as "effective diameter". The aqueous dispersion containing the polymer as particles is characterized by a milky white appearance. The level of polymer particles in the aqueous dispersion is typically in the range of from 15 to 60 weight %, based on the weight of the aqueous dispersion. The aqueous medium optionally contains water miscible solvents such as methanol, ethanol, isopropanol, acetone, and 2-methoxyethanol, and tetrahydrofuran. The pH range for the aqueous dispersion of this embodiment is typically in the range of 1 to 5, more preferably in the range of 1 to 4, and most preferably in the range of 1 to 3, for a polymer prepared from acid monomer; and typically in the range of 8 to 13, more preferably 8 to 12, and most preferably in the range of 9 to 11, for a polymer prepared from an amine monomer.

In another embodiment, the polymer is provided as an aqueous composition containing the polymer as a partly or fully solubilized polymer in an aqueous medium. Partly soluble polymer refers to a polymer that is not fully soluble in the aqueous medium, such as a swellable polymer particle that is enlarged by imbibing the aqueous medium but still retains some aspect of the particle shape. The solution containing the partly or completely solubilized polymer is characterized as having a translucent, semi-transparent, or transparent appearance. Suitable pH ranges for the aqueous solution of this embodiment are related to the level of pendant ionic groups attached to the polymer. A polymer containing 95 to 100 weight % acid monomer as polymerized units, based on the total weight of the polymer, is typically soluble in the aqueous medium at a pH in the range of from 1 to 14. A polymer containing less than 70 weight % acid monomer as polymerized units, based on the total weight of the polymer, is typically partly or completely soluble in an aqueous medium having a pH that is at or above the $pK_a$ of the pendant acid groups. For example, a polymer containing from containing from 25 to 65 weight % polymerized acid monomer, based on the total weight of the polymer, is typically partly or completely soluble at a pH in the range of 5 to 14. A polymer containing 30 to 100 weight % amine monomer as polymerized units, based on the total weight of the polymer, is typically soluble in the aqueous medium at a pH in the range of from 1 to 12.

Suitable bases to adjust the pH of the aqueous medium include mineral bases such as sodium hydroxide and potassium hydroxide; ammonium hydroxide; and organic bases such as triethylamine. Suitable acids to adjust the pH of the aqueous medium include mineral acid such as hydrochloric acid, phosphorus acid, and sulfuric acid; and organic acids such as acetic acid.

The polymer contained in the aqueous composition of this invention is formed by a polymerization process that includes aqueous free radical polymerization of the ionic monomer and the optional second monomer in the presence of from 0.01 to 1 weight %, based on the total weight of the polymer, of a select free radical source. The select free radical source is an organic compound selected from t-alkyl hydroperoxides, t-alkyl peroxides, and t-alkyl peresters, wherein the t-alkyl group has at least 5 carbon atoms. The inventors have surprisingly found that employing a relatively hydrophobic free radical source having t-alkyl groups of at least 5 carbon atoms in the aqueous preparation of a polymer from hydrophilic ionic monomer, in particular, greater than 7.5 weight % acid monomer or amine monomer, provided polymers with improved batch-to-batch reproducibility of the thickening efficiency or the viscosity of the neutralized polymer. Examples of suitable organic compounds include t-alkyl peroxides such as t-amyl peroxide, t-hexyl peroxide, t-heptyl peroxide, and t-octyl peroxide; t-alkyl hydroperoxides such as t-amyl hydroperoxide, t-hexyl hydroperoxide, 2-(4-methyl-cyclohexyl)-prop-2-yl-hydroperoxide, and 2,4,4-trimethylpenyl-2-hydroperoxide; and t-alkyl peresters such as t-amyl peroxypivalate, t-amyl peroxyacetate, t-amyl peroxy-3,5,5-trimethyl hexanoate. Preferred is an organic compound selected from t-alkyl hydroperoxides, t-alkyl peroxides, and t-alkyl peresters, wherein the t-alkyl group has from 5 to 20 carbon atoms, preferably from 5 to 13 carbon atoms, and more preferably from 5 to 10 carbon atoms. Further, preferred are t-alkyl hydroperoxides wherein the t-alkyl group includes at least 5 carbon atoms. A more preferred organic compound is t-amyl hydroperoxide.

Preferably, redox systems using one or more of the organic compounds in combination with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfate, sulfide, hydrosulfide, dithionite, formadinesulfinic acid, hydroxymethanesulfonic acid, sodium 2-hydroxy-2-sulfinatoacetic acid, acetone bisulfite, amines such as ethanolamine, acids such as gly- colic acid, glyoxylic acid hydrate, lactic acid, glyceric acid, malic acid, tartaric acid, and salts of the preceding acids are used in the polymerization process of this invention. More preferably, the process includes at least one organic compound, a suitable reductant, and one or more redox reaction catalyzing metal salts such as iron, copper, manganese, silver, platinum, vanadium, nickel, chromium, palladium, and cobalt.

The aqueous polymerization process optionally includes conventional hydrophilic free radical initiators (oxidants) in addition to the organic compound. Conventional hydrophilic free radical initiators are free radical sources that are not the organic compound. Examples of suitable conventional free radical initiators include hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisic acid. The conventional hydrophilic free radical initiators are optionally used as a component of a redox system in combination with a suitable reductant. Optionally, the redox system including a conventional hydrophilic free radical initiator also employs one or more redox reaction catalyzing metal salts. Typical levels of the optional conventional free radical initiators are from 0.01 to 3 weight %, based on the weight of total weight of the polymer.

In certain embodiments of the present invention, it is advantageous to choose a mixture containing the organic compound and one or more other additional oxidants such as conventional hydrophilic free radical initiators in order to increase the overall efficiency of the initiator system with regard to the initiation of the full range of the ionic monomers, hydrophilic second monomers, and hydrophobic second monomers. Preferably the optional additional conventional hydrophilic free radical initiator(s) are less than 50 weight % of the total amount of the initiator/oxidant used in the polymerization process. In this embodiment, the initiator selected from t-alkyl hydroperoxide, t-alkyl peroxide, and t-alkyl perester wherein the t-alkyl group includes at least 5 carbon atoms and the optional at least one other conventional hydrophilic free radical initiator are used either in the presence or in the absence of a suitable reductant, such as those listed hereinabove.

By "in the presence of 0.01 to 1 weight %, based on the total weight of the polymer, an organic compound selected from t-alkyl hydroperoxides, t-alkyl peroxides, t-alkyl peresters, and mixtures thereof, wherein the t-alkyl group has at least 5 carbon atoms" is meant that the cumulative amount of the organic compound that has been added to the reaction zone wherein at least some of the monomers are being converted to the polymer is 0.01 to 1 weight % based on the total weight of the polymer. Optionally, at least 95 weight % of the monomers, preferably the last 95 weight % of the monomers, are converted to polymer in the presence of the 0.01 to 1 weight % of the organic compound, based on the total weight of the polymer. Optionally, at least 75 weight % of the monomers, preferably the last 75 weight % of the monomers, are converted to polymer in the presence of the 0.01 to 1 weight % of the organic compound, based on the total weight of the polymer. Optionally, at least 50 weight % of the monomers, optionally the last 50 weight % of the monomers, are converted to polymer in the presence of the 0.01 to 1 weight % of the organic compound, based on the total weight of the polymer. Optionally, at least 20 weight % of the monomers are converted to polymer in the presence of the 0.01 to 1 weight % of the organic compound, based on the total weight of the polymer.

In one embodiment, after 90 to 99.7 weight %, preferably 95 to 97 weight %, of the monomer, based on the total weight of the polymer, has been converted to polymer, at least half of the remaining monomer is converted to polymer in the presence of 0.01 to 1 weight %, based on the total weight of the polymer, of the organic compound. Various methods are suitable for conducting this part of the reaction: for example, after a period of time; in a different reaction vessel or kettle; and at a different temperature than the preceding part of the polymerization process. In this embodiment, preferred organic compounds are t-alkyl hydroperoxides wherein the t-alkyl group includes at least 5 carbon atoms; and a more preferred organic compound is t-amyl hydroperoxide.

Various methods are suitable to add the organic compound, the optional additional oxidant(s), the optional reductants, and the optional catalyzing metal salt(s) to the reaction vessel, including, for example, adding together or separately; in one or more shots, or gradually, adding uniformly or not; and in combinations thereof or variations thereon as is desired. The organic compound and the other optional material are added neat, in solution, or emulsified in an appropriate medium.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans are suitable polymerization adjuvants for lowering the molecular weight of the formed polymer and/or to provide a different molecular weight distribution than would otherwise have been obtained with any free radical generating initiator(s). Linear or branched $C_4$–$C_{22}$ alkyl mercaptans such as n-dodecyl mercaptan and t-dodecyl mercaptan are preferred. Typically, chain transfer(s) are added in one or more additions or continuously, linearly or not, over most or all of the entire reaction period or during limited portion(s) of the reaction period such as, for example, in the kettle charge and in the reduction of the residual monomer stage.

Suitable polymerization techniques to prepare the polymer include emulsion polymerization and solution polymerization.

Emulsion polymerization techniques, suitable for preparing the aqueous composition as polymer particles dispersed in an aqueous medium, are well known in the art and are discussed in detail in D. C. Blackley, *Emulsion Polymerization* (Wiley, 1975) and in H. Warson, *The Applications of Synthetic Resin Emulsion*, Chapter 2 (Ernest Benn Ltd., London 1972). In the emulsion polymerization process, conventional surfactants are commonly used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the total weight of monomers. The reaction temperature is maintained at a temperature lower than 120° C. throughout the course of the reaction. Preferred is a reaction temperature between 30° C. and 95° C., more preferably between 50° C. and 90° C. Methods to add the monomer mixture include adding neat and as an emulsion in water. The monomer mixture may be added in one or more additions or continuously, linearly or not, over the reaction period, or combinations thereof.

Suitable emulsion polymerization processes include sequential polymerization techniques involving two or more separate polymerization steps. For example, in a two stage emulsion polymerization process, a first polymer is prepared by emulsion polymerization of a first monomer mixture, and is followed by the preparation of a second polymer in the presence of the first polymer by emulsion polymerization of a second monomer mixture. The polymer particles of the polymers prepared by sequential polymerization techniques have a variety of morphologies including core-shell, acorn or partially encapsulated core-shell, and multilobe morphologies. In one embodiment, sequential polymerization is used to prepare a polymer particle having a water insoluble core and a shell that contains acid monomer as polymerized units. The core, the shell, or both the core and the shell are prepared polymerization in the presence of the organic compound. Preferably, the shell is polymerized in the presence of the organic compound. The shell containing acid monomer as polymerized units, is swellable in the presence of base. These soluble shell polymers are useful as self thickening aqueous dispersion. Soluble shell polymers are disclosed in U.S. Pat. Nos. 5,266,646 and 5,451,641.

Solution polymerization techniques, suitable for preparing the polymer as a solution polymer, are well known in the art and are discussed in U.S. Pat. No. 4,054,717.

The aqueous polymerization process of the preset invention is conducted in an aqueous reaction mixture, which contains at least one monomer and various synthesis adjuvants such as the free radical sources, buffers, and reductants in an aqueous reaction medium. The aqueous reaction medium is the continuous fluid phase of the aqueous reaction mixture and contains greater than 50 weight % water and optionally one or more water miscible solvents, based on the weight of the aqueous reaction medium. Suitable water miscible solvents include methanol, ethanol, propanol, acetone, ethylene glycol ethyl ethers, propylene glycol propyl ethers, and diacetone alcohol. Preferably, the aqueous reaction medium contains greater than 90 weight % water, and more preferably, greater than 95 weight % water, based on the weight of the aqueous reaction medium. Most preferred is an aqueous reaction medium containing from 98 to 100 weight % water, based on the weight of the aqueous reaction medium.

In one embodiment, the polymer contains a nonionic surfactant monomer as a second monomer. A nonionic surfactant monomer is an ethylenically unsaturated monomer containing an ethylenically unsaturated group, such as, for example, a (meth)acrylic, a vinyl, a maleate, a styryl, or an α-methyl styryl group; and one or more attached nonionic surfactant moieties, such as a long chain aliphatic or aromatic group attached to an polyoxyalkylene chain. The polyoxyalkylene chain is attached to the ethylenically unsaturated group through a linkage, such as an ester, ether, urethane, or amide. As used herein, the term "nonionic surfactant moiety" means that the nonionic surfactant moiety does not bear an ionic charge at a pH in the range of from 2 to 13. Examples of nonionic surfactant monomers include esters such as $C_8$–$C_{30}$ alkylphenoxy (ethyleneoxy)$_{6-100}$ ethyl (meth)acrylates and maleates, and $C_8$–$C_{30}$ alkoxy (ethyleneoxy)$_{6-50}$ ethyl (meth)acrylates and maleates; ethers such as allyl ethers of $C_8$–$C_{30}$ alkylphenoxy (ethyleneoxy)$_{6-50}$ alcohols; and urethanes such as reaction products of α,α-dimethyl-m-isopropenyl benzyl isocyanate with either $C_8$–$C_{30}$ alkyl(ethyleneoxy)$_{6-50}$ alcohol or $C_8$–$C_{30}$ alkylphenyl(ethyleneoxy)$_{6-50}$ alcohol. Other examples include monomers containing complex hydrophobes as disclosed in U.S. Pat. Nos. 5,401,802 and 5,476,900. Preferred nonionic surfactant monomers are $C_{12}$–$C_{18}$ alkoxy(ethyleneoxy)$_{10\text{-}40}$ ethyl(meth)acrylates. The polymer of this embodiment typically contains as polymerized units, from 20 to 60 weight % acid monomer, from 0.5 to 20 weight % nonionic surfactant monomer, and from to 20 to 79.5 weight % of at least one other second monomer, which is not a nonionic surfactant monomer, based on the total weight of the polymer. In a preferred composition, the polymer of this embodiment contains as polymerized units, from 25 to 50 weight % acid monomer, from 2 to 20 weight % nonionic surfactant monomer, and from to 30 to 73 weight % of at least one other second monomer, which is not a nonionic surfactant monomer, based on the total weight of the polymer. The polymer is prepared by aqueous free radical emulsion polymerization in the presence of from 0.01 to 1 weight %, based on the total weight of said polymer, of an organic compound selected from t-alkyl hydroperoxides, t-alkyl peroxides, t-alkyl peresters, and mixtures thereof, wherein said t-alkyl group has at least 5 carbon atoms. Optionally, the polymer is polymerized in the presence of a macromolecular compound having a hydrophobic cavity, such as methyl-β-cyclodextrin and hydroxypropyl-β-cyclodextrin, as discussed in U.S. Pat. No. 5,521,266. The polymer of this embodiment is useful as a hydrophobically modified alkali soluble thickener.

In one embodiment, the aqueous composition contains a polymer including as polymerized units, from 20 to 100 weight % of the amine monomer, and preferably from 50 to 100 weight % of the amine monomer. In this embodiment, the polymer, referred to as a "polyamine", is useful in latex containing coating compositions, such as traffic marking compositions. The polyamine is usefull for improving the application properties of aqueous coatings such as providing traffic marking compositions with a short setup time, as disclosed in U.S. Pat. No. 6,672,379.

The aqueous composition is useful as a dispersing resin or dispersant for pigments. Other applications of the aqueous composition of the present invention are binders for paints and other coating compositions, such as, for example, compositions for preparing removable coatings, high gloss coatings, general industrial finishes, floor and wood coatings, and floor waxes. Substrates suitable for the application of paints and other coating compositions containing the aqueous composition of this invention include metal, wood, stucco, cementitious materials, wall board, plastics, and brick.

If desired and depending on the intended use of the aqueous composition, additional components are optionally added to the aqueous composition. These additional components include but are not limited to dyes; sequestering agents; biocides; pigments, such as, titanium dioxide, organic pigments, and carbon black; extenders, such as, calcium carbonate, talc, clays, silicas, and silicates; fillers such as glass or polymeric microspheres, quartz, and sand; anti-freeze agents; plasticizers; adhesion promoters; coalescents; wetting agents; waxes; surfactants; slip additives; crosslinking agents; defoamers; colorants; preservatives; freeze/thaw protectors; and corrosion inhibitors.

The following examples are presented to illustrate the composition and the process of the invention. These examples are intended to aid those skilled in the art in understanding the present invention. The present invention is, however, in no way limited thereby.

The following abbreviations are used in the examples:

| | |
|---|---|
| BA | butyl acrylate |
| EA | ethyl acrylate |
| MAA | methacrylic acid |
| MMA | methyl methacrylate |
| LMA | lauryl methacrylate |
| NP- | nonyl phenol group |
| $(EO)_x$ | poly(ethylene oxide) of chain length x |
| $(PO)_x$ | poly(propylene oxide) of chain length x |
| t-AHP | t-amyl hydroperoxide |
| t-BHP | t-butyl hydroperoxide |
| nDDM | n-dodecyl mercaptan |
| metaTMI | α, α-dimethyl-m-isopropenyl benzyl isocyanate |
| IAA | isoascorbic acid |
| SSF | sodium formaldehyde sulfoxylate |
| NaBS | sodium bisulfite |
| MMP | methyl mercaptopropionate |
| g | gram |

EXAMPLE 1

Preparation of the Aqueous Composition and Comparative Aqueous Composition

Aqueous compositions and comparative aqueous compositions that contain polymerized acid monomer are prepared using emulsion polymerization.

EXAMPLE 1.1

A monomer emulsion is prepared containing 650 g EA, 250 g MAA, 100 g of nonionic surfactant monomer having the structure $C_{12}$—O—$(EO)_{20}$-maleate ($C_{12}$ represents an alkyl group having 12 carbon atoms), 1 g nDDM, 693 g water, and 18 g sodium lauryl sulfate (28% active).

To a 4-neck, 5-liter flask fitted with a thermometer, a stirrer, and a reflux condenser, is added 1300 g deionized water and 18 g sodium lauryl sulfate (28% active). The contents of the flask are heated to 85° C. Next, a solution containing 2 g sodium persulfate dissolved in 200 g deionized water is added to the flask, followed by the gradual addition of the monomer emulsion over a period of 120 minutes, while the contents of the flask are maintained at 85° C. Upon completion of the monomer feed, the contents of the flask are maintained at 85° C. for a period of 15 minutes, followed by cooling to 60° C. Next, a mixture containing 2 g t-AHP in 50 g deionized water and a solution containing 1 g IAA in 50 g deionized water are added to the flask. The contents of the flask are maintained at 60° C. for 30 minutes, and then are cooled to room temperature. The resulting aqueous composition of Example 1.1 is a dispersion containing polymer particles having an average diameter of 120 nm. The aqueous composition has a solids content of 29.5 weight % and a pH of 2.9. The polymer has an average composition of 65EA/25MAA/10$C_{12}$—O—$(EO)_{20}$-maleate.

Comparative Example 1.1C

Comparative Example 1.1C is prepared according to the procedure for Example 1.1 except that t-BHP is substituted for t-AHP.

EXAMPLE 1.2

Example 1.2 is prepared according to the procedure for Example 1.1 except that the monomer emulsion contains 400 g EA, 500 g MAA, 100 g of nonionic surfactant monomer having the structure $C_{16}$—O—$(EO)_{40}$ ester of methacrylic acid, 1 g nDDM, 693 g water, and 18 g sodium lauryl sulfate (28% active).

Comparative Example 1.2C

Comparative Example 1.2C is prepared according to the procedure for Example 1.2 except that t-BHP is substituted for t-AHP.

EXAMPLE 1.3

Example 1.3 is prepared according to the procedure for Example 1.1 except that the monomer emulsion contains 550 g EA, 400 g MAA, 50 g of nonionic surfactant monomer having the structure $C_{18}$—O—$(EO)_{10}$—$CH_2CH$=$CH_2$, 693 g water, and 18 g sodium lauryl sulfate (28% active); and NaBS is substituted for IAA.

Comparative Example 1.3C

Comparative Example 1.3C is prepared according to the procedure for Example 1.3 except that t-BHP is substituted for t-AHP.

EXAMPLE 1.4

Example 1.4 is prepared according to the procedure for Example 1.1 except that the monomer emulsion contains 450 g EA, 500 g MAA, 50 g stearyl methacrylate, 1 g octyl mercaptan, 693 g water, and 18 g sodium lauryl sulfate (28% active); and SSF is substituted for IAA.

Comparative Example 1.4C

Comparative Example 1.4C is prepared according to the procedure for Example 1.4 except that t-BHP is substituted for t-AHP.

EXAMPLE 1.5

A monomer emulsion is prepared containing 300 g EA, 600 g MAA, 100 g of nonionic surfactant monomer having the structure $C_{12}$—O—$(EO)_{23}$—C(O)—NH—$C(CH_3)_2$—$C_6H_4$—$C(CH_3)$=$CH_2$, 3 g nDDM, 693 g water, and 18 g sodium lauryl sulfate (28% active).

To a 4-neck, 5-liter flask fitted with a thermometer, a stirrer, and a reflux condenser, is added 1300 g deionized water and 18 g sodium lauryl sulfate (28% active). The contents of the flask are heated to 60° C. Next, the monomer emulsion is added to the flask over a period of 120 minutes while a solution containing 4 g t-AHP in 150 g deionized water and a second solution containing 2 g SSF in 150 g deionized water are separately cofed to the flask over a period of 120 minutes. The contents of the flask are maintained at 60° C. during the addition of the monomer emulsion and the two solutions. Next, the contents of the flask are cooled to room temperature. The resulting aqueous composition of Example 1.5 is a dispersion containing polymer particles having an average diameter of 120 nm. The aqueous composition has a solids content of 29.5 weight % and a pH of 2.9.

Comparative Example 1.5C

Comparative Example 1.5C is prepared according to the procedure for Example 1.5 except that t-BHP is substituted for t-AHP.

EXAMPLE 1.6

Example 16 is prepared according to the procedure for Example 1.5 except that the monomer emulsion contains 650 g EA, 250 g MAA, 100 g of nonionic surfactant monomer having the structure nonyl phenol-O—$(EO)_{30}$—C(O)—NH—$C(CH_3)_2$—$C_6H_4$—$C(CH_3)$=$CH_2$, 3 g nDDM, 693 g water, and 18 g sodium lauryl sulfate (28% active).

Comparative Example 1.6C

Comparative Example 1.6C is prepared according to the procedure for Example 1.6 except that t-BHP is substituted for t-AHP.

EXAMPLE 1.7

Example 17 is prepared according to the procedure for Example 1.5 except that the monomer emulsion contains 600 g EA, 250 g MAA, 150 g of nonionic surfactant monomer having the structure nonyl phenol-O—$(EO)_{10}$—$(PO)_2$—NH—C(O)—NH—$(CH_2)_2$—OC(O)—$C(CH_3)$=$CH_2$, 2 g methyl mercaptopropionate, 693 g water, and 18 g sodium lauryl sulfate (28% active); and IAA is substituted for SSF.

Comparative Example 1.7C

Comparative Example 1.7C is prepared according to the procedure for Example 1.7 except that t-BHP is substituted for t-AHP.

EXAMPLE 1.8

Example 18 is prepared according to the procedure for Example 1.5 except that the monomer emulsion contains 500 g EA, 500 g MAA, 693 g water, and 18 g sodium lauryl sulfate (28% active); and IAA is substituted for SSF.

Comparative Example 1.8C

Comparative Example 1.8C is prepared according to the procedure for Example 1.6 except that t-BHP is substituted for t-AHP.

EXAMPLE 2

Batch-to-Batch Variability

The batch-to-batch variabilities of the aqueous composition of this invention and a comparative aqueous composition are characterized by measuring the soluble solution viscosity. Aqueous solutions containing solubilized polymer are prepared by combining deionized water, 2.16 g polymer (solids), and a sufficient amount of 0.5 N sodium hydroxide solution to titrate the solution to a phenolphthalein end point. The total weight of the solubilized polymer solution sample is 240 g. The viscosity of the solubilized polymer solution is measured using a Brookfield™ Model DV-111 Programmable Rheometry (Brookfield Engineering Corp, MA)

equipped with a LV-4 spindle at 12 rotations per minute. The temperature of the solubilized polymer solution is 20° C.

Ten separate batches of the aqueous composition of Example 1.2 and ten separate batches of the comparative aqueous composition of Example 1.2C are prepared. Solubilized polymer solutions are prepared and the viscosities are measured for each one of the batches. Table 2.1 lists the viscosities of the solubilized polymer solutions and comparative solubilized polymer solutions in units of Pascal-second (Pa-s).

TABLE 2.1

Solubilized Viscosities of Aqueous Composition and Comparative Aqueous Composition

| Polymer 2.1 Batch | Viscosity (Pa-s) | Polymer 2.1C Batch | Viscosity (Pa-s) |
| --- | --- | --- | --- |
| a | 8.233 | a | 8.318 |
| b | 8.126 | b | 9.440 |
| c | 7.790 | c | 9.872 |
| d | 8.055 | d | 7.844 |
| e | 8.010 | e | 8.902 |
| f | 7.948 | f | 10.048 |
| g | 7.882 | g | 8.566 |
| h | 8.141 | h | 8.104 |
| I | 7.843 | i | 9.551 |
| j | 8.021 | j | 9.498 |
| average (±1σ) | 8.005 (±0.141) | average | 9.014 (±0.775) |

The average viscosities of the ten batches of the aqueous composition of Example 1.2 and the ten batches of the comparative aqueous composition of Example 1.2C are calculated. The batch-to-batch variations in viscosity are calculated and are reported as 1 σ. The results show that the batch-to-batch variability in the solubilized viscosity of the aqueous composition of this invention is smaller than the batch-to-batch variability in the solubilized viscosity of the comparative aqueous composition.

EXAMPLE 3

Preparation of an Aqueous Composition and Comparative Aqueous Composition Containing Polyamines Aqueous compositions and comparative aqueous compositions that contain polymerized amine monomer are prepared using aqueous free radical polymerization.

EXAMPLE 3.1

To a 2-liter reactor containing 643 g deionized water under a nitrogen atmosphere at 60° C., 2.8 g of an aqueous solution of ferrous sulfate heptahydrate (0.15% by weight) and 0.8 g of an aqueous solution of the tetrasodium salt of ethylenediamine tetraacetic acid (1% by weight) diluted with 10 g deionized water are added with stirring. Next, 16.2 g of acetic acid is added to the reactor. A solution composed of 200 g 2-(3-oxazolidinyl)ethyl methacrylate and 100 g deionized water is added over a 2 hour period. Simultaneously, feeds composed of 1.9 g t-AHP and 2 g SSF dissolved in 23 g deionized water are added over a 2 hour period. After completion of the feeds, the reaction is held at 60° C. for 30 minutes. Next, 0.15 g t-AHP is added. Fifteen minutes later, 0.095 g t-AHP and 0.06 g SSF dissolved in 10 g deionized water are added. Fifteen minutes later, the reaction is cooled to room temperature. The final reaction mixture has a pH of about 8, a solids content of 20% and Brookfield viscosity of less than 0.500 Pa-s. The polymer has a $M_w$ of 38,000, a $M_n$ of 15,600, and a polydispersity $(M_w/M_n)$ of 2.4.

Comparative Example 3C

To a 2-liter reactor containing 600 g deionized water under a nitrogen atmosphere at 60° C., 2.8 g of an aqueous solution of ferrous sulfate heptahydrate (0.15% by weight) and 0.8 g of an aqueous solution of the tetrasodium salt of ethylenediamine tetraacetic acid (1% by weight) diluted with 10 g deionized water are added with stirring. Next, 16.2 g of acetic acid is added to the reactor. A feed composed of 200 g 2-(3-oxazolidinyl)ethyl methacrylate and 100 g deionized water is added over a 2 hour period. Simultaneously, feeds composed of 2 g t-BHP dissolved in 23 g deionized water and 2 g SSF dihydrate dissolved in 23 g deionized water are added over a 2 hour period. After completion of the feeds, the reaction is held at 60° C. for 30 minutes. Next, a solution containing 0.16 g t-BHP dissolved in 10 g deionized water is added. Fifteen minutes later, solutions containing 0.1 g t-BHP dissolved in 10g deionized water and 0.06 g SSF dissolved in 10 g deionized water are added. Fifteen minutes later, the reaction is cooled to room temperature. The final reaction mixture has a pH of about 8, a solids content of approximately 20%, and Brookfield viscosity <0.500 Pa-s. The comparative polymer has a $M_w$ of 45,000, a $M_n$ of 16,000, and a polydispersity $(M_w/M_n)$ of 2.8.

Evaluation of Example 3.1 and Comparative Example 3C

Aqueous formulations are prepared by combining an aqueous polymer latex with either the aqueous compositions of Example 3.1 or Comparative Example 3C, at the levels listed in Table 3.1. The aqueous polymer latex contains polymer particles having an average diameter of 172 nanometers and has a solids content of 51.7 weight %. The polymer particles contain as polymerized units, 45.6 BA/53.1 MMA/1.3 MAA, on a weight basis.

The stability of the aqueous formulations are determined by heating the samples for 10 days at 60° C. Stability is indicated by the absence of syneresis. Syneresis indicates the aqueous formulation has unacceptable stability. If syneresis occurs, the height of the top separated layer is measured.

TABLE 3.1

Compositions of Aqueous Formulations

| Aqueous Formulation | Example 3.1 (wt. % solids based on latex solids) | Comparative Example 3C (wt % solids based on latex solids) | Stability Test Results |
| --- | --- | --- | --- |
| AF-1 | 0.5 | — | no syneresis |
| AF-2 | 1.5 | — | no syneresis |
| AF-3 | 1.8 | — | no syneresis |
| AF-1C | — | 0.5 | no syneresis |
| AF-2C | — | 1.5 | 0.5 cm syneresis |
| AF-3C | — | 1.8 | 1.0 cm syneresis |

The results in Table 3.1 show that aqueous formulations, AF-1 to AF-3, which are prepared with the aqueous composition of this invention, Example 3.1, are stable at addition levels of up to 1.8 weight %. In contrast, the aqueous formulations, which are prepared with the comparative aqueous composition, Comparative Example 3C are not stable at the levels of addition of 1.5 weight % or greater.

Traffic marking paints are prepared containing the aqueous composition of Example 3.1 and the comparative aqueous composition of Comparative Example 3C. The traffic marking paints are prepared by admixing the ingredients in Table 3.2, in the order listed. After the addition of the calcium carbonate, stirring is continued for 15 minutes before the addition of the remaining ingredients.

TABLE 3.2

Compositions of Traffic Marking Paints

| Ingredient | Paint 3.1 | Paint 3C |
|---|---|---|
| Aqueous Formulation AF-3 | 627.7 g | — |
| Comparative Aqueous Formulation AF-3C | — | 627.7 g |
| Tamol ™ 901 dispersant (Rohm and Haas Company) | 9.8 g | 9.8 g |
| Surfynol ™ CT-136 surfactant (Air Products and Chemicals) | 3.8 g | 3.8 g |
| Drew ™ L-493 defoamer (Drew Chemical Co.) | 2.7 g | 2.7 g |
| TiPure ™ R-900 titanium dioxide (E. I. DuPont de Nemours & Co.) | 136 g | 136 g |
| Omyacarb ™ 5 calcium carbonate (Omya, Inc.) | 1035 g | 1035 g |
| methanol | 40.8 g | 40.8 g |
| Texanol ™ coalescent (Eastman Chemical, Inc.) | 31.9 g | 31.9 g |
| water | 25.8 g | 25.8 g |
| Drew ™ L-493 defoamer | 4.8 g | 4.8 g |

The traffic marking paints are tested for stability in accordance with ASTM Standard Method D562 using a Thomas Stormer™ Viscometer, Model VI-9730-G60, supplied by Paul N. Gardner Company, Inc. The viscosity of the traffic paints are first measured and then samples of the traffic marking paints are placed in sealed 0.25 liter containers and are stored in a sealed circulation oven at 60° C. for 10 days. The containers are then removed from the oven and are allowed to cool to room temperature for 1 day. The containers are opened, mixed for 3 minutes on a mechanical mixer, and the viscosities of the samples are remeasured. The stored traffic marking paint is rated to have passed the storage stability test if the viscosity of the traffic marking paint, as measured in Krebs units (KU), did not increase by more than 10 KUs from the initial measurement before it was stored in the oven.

The results in Table 3.3 show that the paint prepared with the aqueous composition of this invention, Example 3.1, has acceptable storage stability. In contrast, the comparative paint, prepared with the comparative aqueous composition, does not have acceptable storage stability

TABLE 3.3

Paint Test Results

| Storage Stability | Paint 1 | Paint C1 |
|---|---|---|
| Change in Viscosity | <10 KU | >10 KU |

EXAMPLE 4

Preparation of Aqueous Composition Useful as Dispersant

EXAMPLE 4.1

The reaction vessel is a 4-neck, 500 ml round bottom flask equipped with a Claisen head fitted with a condenser and septum inlet, an overhead stirrer, a thermocouple attached to a temperature control device, and a septum inlet. To the flask, 100 g deionized water and 3.0 g ferric sulfate heptahydrate are added. The contents of the flask are heated to 90° C. Next, 90.0 g acrylic acid, 95.0 g sodium hydroxide (50 wt. %), and 30.0 g hydrogen peroxide (30 wt. %) are cofed over a period of 120 minutes. Upon completion of the feeds, the contents of the flask are held at a temperature of 90° C. for 30 minutes and then cooled to 60° C. Next, a solution containing 3.0 g sodium metabisulfite in 10 g deionized water is added to reduce excess hydrogen peroxide.

The resulting solution polymer at this point has a molecular weight in the range of from 15,000 to 18,000 Daltons and contains approximately 1,000 ppm of residual acrylic acid.

The level of residual acrylic acid is reduced by adding a mixture containing 0.73 grams t-AHP (85% active) in 10 g deionized water and a separate solution containing 0.3 g isoascorbic acid in 10 g deionized water. The two solutions are separately cofed to the flask over a period of 30 minutes. The resulting aqueous composition, Example 4.1, contains 34 wt. % solids, as determined by weight loss after 40 minutes at 150° C.

Comparative Example 4C

Comparative Example 4C was prepare according to the process for Example 4.1 except that the t-AHP is replaced with 0.77 g t-BHP (70% active). The resulting comparative aqueous composition, Comparative Example 4C, contains 34 wt. % solids.

Preparation of Titanium Dioxide Dispersion

An aqueous titanium dioxide dispersion is prepared containing the polymer of Example 4.1.

The titanium dioxide is dispersed by combining 138 g water and 12 g of Example 4.1 (based on dry weight) in a 1-liter stainless steel container. The container is placed on a COWLES Dissolver Model W1215 (Morehouse, Inc.) fitted with a 5 centimeter (2-inch) diameter stainless steel, saw toothed disperser blade. The initial rate of mixing is set to 200 rotations per minute (rpm). Next, 600 g Ti-Pure™ R-706 titanium dioxide (E. I. DuPont de Nemours & Co.) is gradually added to the container while the mixing rate is gradually increased to 3000 rpm. After the complete addition of the titanium dioxide, the mixing at 3000 rpm is continued for 5 minutes.

The viscosity of the resulting titanium dioxide dispersion, Dispersion 4.1, is measured by allowing the dispersion to equilibrate to 25° C. prior to measurement of the viscosity using a Brookfield™ LV viscometer fitted with a small sample adapter. A #18 spindle at 3 rpm is used for the measurement. The viscosity of the aqueous titanium dioxide dispersion containing Example 4.1 is 0.100 Pa-s.

A comparative aqueous titanium dioxide dispersion is prepared containing the polymer of Comparative Example 4C. The comparative aqueous titanium dioxide dispersion is prepared according to the above procedure, except that 12 g of Comparative Example 4C (based on dry weight) is substituted for Example 4.1. The resulting dispersion, Comparative Dispersion 4C has a viscosity greater than 20 Pa-s.

The results show that the aqueous composition of this invention, as exemplified by Example 4.1, is useful for providing titanium dioxide dispersions with lower viscosities than a comparative aqueous composition, which is prepared without employing an organic compound such as t-AHP.

EXAMPLE 5

Aqueous Composition Useful as Alkali Soluble Resin

EXAMPLES 5.1–5.7

The reaction vessel is a 3-liter 4-neck round bottom flask fitted with mechanical stirring, a nitrogen inlet, and a condenser. To the flask, 422.4 g deionized water and 32.1 g of a 20% solution of Surfactant A (mono(nonyl)phenoxy poly(ethyleneoxy)ethyl phosphate ammonium salt) are added with mixing. The contents of the flask are heated to 85° C. under a nitrogen atmosphere. Next, 43 g of an emulsion, prepared by combining 360 g deionized water, 67.2 g Surfactant A, 600 g EA, 200 g styrene, 200 g MAA, and 20 g nDDM, is added to the flask and is followed by the addition of a solution containing 4.9 g ammonium persulfate in 19.9 g deionized water. Then the remainder of the emulsion and a solution containing 1.2 g of ammonium persulfate in 109.5 g deionized water are concurrently added to the reactor over a period of 3 hours while maintaining the contents of the flask at 80° C. After completion of the feeds, the contents of the flask are allowed to cool to less than 60° C. and a solution of 0.01 g ferrous sulfate heptahydrate in 8.8 g deionized water is added to the flask. Next, a mixture containing 2.5 g t-AHP in 12.3 g deionized water and a separate solution containing 0.3 g sodium sulfoxylate formaldehyde in 14.7 g deionized water are added. A final dilution of 9.8 g deionized water is added to the reactor.

Seven batches are prepared by the above process to provide Examples 5.1 to 5.7. These examples are aqueous polymer dispersions having an average solids content of 50.1 wt. %, an average pH of 3.3, and an average viscosity of 0.5 Pa-s. The polymer is dispersed as particles having an average diameter of 125 nm.

Comparative Examples 5.1C–5.7C

Seven batches of a comparative aqueous composition are prepared according to the process for Example 5.1, except that 2.5 g t-BHP is substituted for 2.5 g t-AHP.

The seven batches of the comparative aqueous composition, Comparative Examples 5.1C to 5.7C have an average solids content of 50.1 weight %, an average pH of 3.3, and an average viscosity of 0.5 Pa-s. The comparative polymer is provided as dispersed particles having an average diameter of 125 nm.

Solubilized Solution Viscosities

Solubilized solutions of Examples 5.1 to 5.7 and Comparative Examples 5.1C to 5.7C are prepared by diluting 80 g of each example in 100 g deionized water. The resulting mixture is neutralized with 5.2 g of 29% aqueous ammonia. The resulting solubilized solution is allowed to equilibrate for 2 hours. Next, a sufficient amount of aqueous ammonia (29% active) is added to adjust the pH of the solubilized solution to 9.8 to 10.0. Deionized water is then added to adjust the final solids of the solution, as determined by weight loss after 30 minutes at 150° C., to 19.9 to 20.1 wt. %. The solubilized solution is allowed to equilibrate for 24 hours. The clarity and the viscosity are evaluated with the solubilized solution at 25° C. Clarity is visually determined. Viscosity is measured with a Brookfield™ LVTD Viscometer. The evaluations for solubilized solution viscosity and clarity are performed within one week of synthesis.

TABLE 5.1

Solubilized Solution Viscosity (SSV) of Examples 5.1 to 5.7 and Comparative Examples 5.1C to 5.7C

| | SSV | Appearance |
|---|---|---|
| Example | | |
| 5.1 | 0.510 Pa-s | clear |
| 5.2 | 0.615 Pa-s | clear |
| 5.3 | 0.540 Pa-s | clear |
| 5.4 | 0.590 Pa-s | clear |
| 5.5 | 0.600 Pa-s | clear |
| 5.6 | 0.570 Pa-s | clear |
| 5.7 | 0.565 Pa-s | clear |
| average (±1σ) | 0.570 ± 0.036 Pa-s | |
| Comparative Examples | | |
| 5.1C | 0.620 Pa-s | clear |
| 5.2C | 0.880 Pa-s | haze |
| 5.3C | 0.794 Pa-s | clear |
| 5.4C | 0.920 Pa-s | haze |
| 5.5C | 0.730 Pa-s | haze |
| 5.6C | 0.890 Pa-s | haze |
| 5.7C | 0.850 Pa-s | clear |
| average (±1σ) | 0.812 ± 0.106 Pa-s | |

The results in Table 5.1 show that aqueous compositions of this invention, which are prepared by the aqueous polymerization process of this invention, have increased batch-to-batch reproducibility. The batch-to-batch reproducibility is characterized by the variation in solubilized solution viscosity for the various batches. In particular, the solubilized solution viscosities for Examples 5.1 to 5.7 have a variation of 0.036 Pa-s, or 6.3%, while the solubilized solution viscosities of Comparative Examples 5.1C to 5.7C have a variation of 0.106 Pa-s, or 13%.

The solubilized solutions prepared from the aqueous composition of this invention, as exemplified by Examples 5.1 to 5.7, have clear appearances, indicating the polymer is solubilized. In contrast, several of the batches of the comparative aqueous composition have hazy appearances indicating that some portion of the comparative polymer is not solubilized.

Effect of Aging on the Solubilized Solution Viscosity

The aqueous compositions of Examples 5.1 to 5.7 and the comparative aqueous compositions of Comparative Examples 5.1C to 5.7C are aged for 6 months. Solubilized solutions are prepared from these samples and the solubilized solution viscosities are measured.

TABLE 5.2

Solubilized Solution Viscosity (SSV) of Aged Examples 5.1 to 5.7 and Aged Comparative Examples 5.1C to 5.7C

| | Aged SSV | ΔSSV | Appearance (Aged) |
|---|---|---|---|
| Example | | | |
| 5.1 | 0.550 Pa-s | +0.040 Pa-s | clear |
| 5.2 | 0.600 Pa-s | −0.015 Pa-s | clear |
| 5.3 | 0.565 Pa-s | +0.025 Pa-s | clear |
| 5.4 | 0.580 Pa-s | −0.010 Pa-s | clear |
| 5.5 | 0.585 Pa-s | −0.015 Pa-s | clear |
| 5.6 | 0.600 Pa-s | +0.030 Pa-s | clear |
| 5.7 | 0.570 Pa-s | +0.005 Pa-s | clear |

TABLE 5.2-continued

Solubilized Solution Viscosity (SSV) of Aged Examples 5.1 to 5.7 and
Aged Comparative Examples 5.1C to 5.7C

| | Aged SSV | ΔSSV | Appearance (Aged) |
|---|---|---|---|
| Comparative Example | | | |
| 5.1C | 0.910 Pa-s | +0.290 Pa-s | haze |
| 5.2C | 0.1000 Pa-s | +0.120 Pa-s | haze |
| 5.3C | 0.970 Pa-s | +0.176 Pa-s | haze |
| 5.4C | 1.100 Pa-s | +0.180 Pa-s | haze |
| 5.5C | 0.955 Pa-s | +0.225 Pa-s | haze |
| 5.6C | 1.090 Pa-s | +0.200 Pa-s | haze |
| 5.7C | 1.110 Pa-s | +0.260 Pa-s | haze |

The comparative aqueous compositions, as exemplified by Comparative Examples 5.1C to 5.7C, exhibit large changes in their solubilized viscosities upon ageing in comparison to the changes in the solubilized viscosities of the aged samples prepared from the aqueous compositions of this invention. Further, several comparative solubilized solutions that do not initially exhibit haze shortly, have increased haze upon ageing. The solubilized solutions prepared from the aqueous compositions of this invention, as exemplified by Examples 5.1 to 5.7, do not exhibit haze either initially after preparation or upon ageing.

The invention claimed is:

1. An aqueous composition comprising:
a polymer comprising as polymerized units, based on the total weight of said polymer:
   a) from greater than 7.5 to less than 100 weight % of at least one ionic monomer, and
   b) from greater than 0 to less than 92.5 weight % of a nonionic surfactant monomer;
wherein said polymer is formed by an aqueous free radical polymerization process in the presence of 0.01 to 1 weight %, based on the total weight of said polymer, of an organic compound selected from the group consisting of t-alkyl hydroperoxides, t-alkyl peroxides, t-alkyl peresters, and mixtures thereof, wherein said t-alkyl group has at least 5 carbon atoms.

2. The aqueous composition according to claim 1, wherein said aqueous free radical polymerization process comprises the steps of polymerizing 90 to 99.7 weight % of said monomers, based on the total weight of said polymer, and then polymerizing at least half of the remaining monomer in the presence of 0.01 to 0.5 weight % of said organic compound, based on the total weight of said polymer.

3. The aqueous composition according to claim 2 wherein said organic compound is present only after polymerization of 90 weight % of said monomers, based on the total weight of said polymer.

4. The aqueous composition according to claim 1 wherein said polymer comprises from 25 to 65 weight % of at least one ionic monomer.

5. An aqueous polymerization process for preparing an aqueous composition comprising a polymer, said polymer comprising as polymerized units, from greater than 25 to less than 100 weight % of at least one ionic monomer; and from greater than 0 to less than 92.5 weight % of a nonionic surfactant monomer, based on the total weight of said polymer;
comprising the step of:
   polymerizing said monomers in an aqueous reaction medium by free radical polymerization in the presence of 0.01 to 1 weight %, based on the total weight of said polymer, of an organic compound selected from the group consisting of t-alkyl hydroperoxides, t-alkyl peroxides, t-alkyl peresters, and mixtures thereof, wherein said t-alkyl group has at least 5 carbon atoms.

6. The process according to claim 5 comprising the step of polymerizing from 90 to 99.7 weight % of said monomers, based on the total weight of said polymer, and then the step of polymerizing at least half of the remaining monomer in the presence of 0.01 to 0.5 weight % of said organic compound, based on the total weight of said polymer.

7. The process according to claim 6 wherein said organic compound is present only after polymerization of 90 weight % of said monomers, based on the total weight of said polymer.

8. The process according to claim 5 wherein said polymer comprises from 25 to 65 weight % of at least one ionic monomer.

9. The aqueous composition according to claim 1, wherein said polymer comprises from 35 to 75 weight % of nonionic surfactant monomer.

10. The aqueous composition according to claim 1, wherein said polymer comprises a weight average molecular weight of 1,000 to 100,000.

11. The aqueous composition according to claim 1, wherein said polymer comprises a weight average molecular weight of 25,000 to 1,000,000.

12. The aqueous composition according to claim 1, wherein said polymer comprises greater than 70 weight %, based on total weight of said polymer, copolymerized units derived from (meth)acrylic monomers.

13. The aqueous composition according to claim 1, wherein said polymer comprises a swellable polymer that solubilizes upon neutralization.

14. The process according to claim 5 wherein said polymer comprises from 35 to 75 weight % of nonionic surfactant monomer.

15. The process according to claim 5 further comprising neutralizing said polymer to form a solubilized solution.

* * * * *